United States Patent [19]
Delgado et al.

[11] 4,274,809
[45] Jun. 23, 1981

[54] VERTICAL AXIS WIND TURBINES

[75] Inventors: Patricio E. Delgado; Barry A. Holmes, both of Alresford, England

[73] Assignee: P.I. Specialist Engineers Limited, London, England

[21] Appl. No.: 83,629

[22] Filed: Oct. 11, 1979

[30] Foreign Application Priority Data

Oct. 11, 1978 [GB] United Kingdom ............... 40088/78

[51] Int. Cl.³ .......................... F03D 3/06; F03D 7/06
[52] U.S. Cl. .................................. 416/117; 416/132 B
[58] Field of Search ..................... 416/117, 119, 132 B

[56] References Cited

U.S. PATENT DOCUMENTS

| 31,789 | 3/1861 | Giraudat | 416/52 |
|---|---|---|---|
| 148,927 | 3/1874 | Chapin | 416/83 |
| 252,860 | 1/1882 | Arthurs et al. | 416/119 |
| 873,460 | 12/1907 | Sakovitch | 416/117 |
| 893,337 | 7/1908 | Lynn | 416/117 X |
| 1,212,109 | 1/1917 | Rodwick | 416/117 X |
| 1,443,912 | 1/1923 | Dominguez | 416/197 A X |
| 3,918,839 | 11/1975 | Blackwell et al. | 416/227 A X |
| 4,087,202 | 5/1978 | Musgrove | 416/117 X |
| 4,105,363 | 8/1978 | Loth | 416/140 X |
| 4,130,380 | 12/1978 | Kaiser | 416/227 A |

FOREIGN PATENT DOCUMENTS

| 1045038 | 12/1978 | Canada | 416/139 A |
|---|---|---|---|
| 403693 | 11/1909 | France | 416/108 |
| 40341 | 6/1932 | France | 416/117 |
| 2298707 | 8/1976 | France | 416/227 A |

*Primary Examiner*—Everette A. Powell, Jr.
*Attorney, Agent, or Firm*—Birch, Stewart, Kolasch & Birch

[57] ABSTRACT

A vertical wind turbine having vertical blades, each blade being connected intermediate its ends by a hinge to a support arm having a hub that enables the blades to rotate around a vertical axis, a tie wire connected to the blade at positions spaced along the blade from the hinge, said tie wire engaging a spring-loaded pulley disposed inwardly of the blades, the arrangement being such that when the angle of inclination of the blades to the vertical axis alters under the action of centrifugal force the tie wire exerts a force on the pulley opposing the spring force whereby as the turbine speeds up the blades will remain at a predetermined angle of inclination until the force exerted by the wire exceeds the force of the spring. One end of the tie wire can be connected to a position on one blade and connected to another position on another blade so that all of the blades adopt the same angle of inclination to the vertical axis.

11 Claims, 3 Drawing Figures

VERTICAL AXIS WIND TURBINES

BACKGROUND OF THE INVENTION

This invention relates to vertical axis wind turbines.

Vertical axis wind turbines are known such as that disclosed in U.S. Pat. No. 4,087,202 (P. J. Musgrove) but the blades of such turbines are subjected to large bending stresses due to centrifugal force action. This limits the rotational speed which can be achieved in use of the turbine.

SUMMARY OF THE INVENTION

This invention relates as aforesaid to vertical axis wind turbines.

According to the invention there is provided a vertical axis wind turbine comprising at least one blade, support means mounting the or each blade to enable the blade to rotate around the vertical axis, the or each blade being hinged to the support means at a hinge position whereby the angle of inclination of the blade to the vertical axis can vary, a tie wire connected to said one blade at a position along the blade spaced in one sense from the hinge position and connected to said one blade or to another said blade at a position along the blade spaced in the other sense from the hinge position, and a member disposed radially inwardly of the blade(s) and supporting the tie wire.

By virtue of the above-described arrangement, bending stresses on the blade(s) caused by centrifugal force action can be relieved.

In a preferred arrangement, the tie wire extends around said member, the member is disposed such that when the angle of inclination of the blade(s) so the vertical axis tends to alter from a predetermined value under the action of centrifugal force the tie wire exerts a force on the member tending to move the member, and control means is provided to exert a force on the member opposing said movement thereof, whereby as the turbine speeds up the blade(s) will remain at the predetermined angle of inclination until the force exerted by the tie wire on the member exceeds the force exerted on the member by the control means. In this way, the blade(s) can, for example, be maintained at an optimum angle of inclination (e.g. zero) to the vertical axis to produce maximum output, and only inclined from the optimum angle, to reduce the ratio of turbine speed to wind speed, and reduce stressing of the blades, if the wind speed increases above a threshold value.

The control means is preferably operative to exert a force on the member which increases with any said movement of the member. This feature helps to further relieve the increased bending stresses on the blade(s) at higher speeds and helps to control movement of the or each blade as it changes its angle of inclination. In this case, the control means may be a resilient biassing means such as a spring, for instance a tension spring acting between said member and the support means.

In the case where the turbine comprises a plurality of blades and tie wires, there may either be a separate control means for each tie wire or a common control means for all of them.

Also in the case where the turbine comprises a plurality of blades, each tie wire may be connected to two positions on the same, respective blade. Preferably, however, each control wire is connected to a position on one blade and to a position on another blade, the arrangement being such that the tie wires ensure that all of the blades adopt the same angle of inclination to the vertical axis.

The hinge position of the or each blade is preferably displaced from the centre of mass of the blade. In a preferred arrangement, the two positions where the tie wire is attached to the blade(s) are spaced by different amounts from the hinge position and said member is vertically spaced from the hinge position in the same sense as that one of said two positions that is farther from the hinge position. The or each blade is preferably an aerofoil section blade and is preferably straight.

An object of the invention is to provide a vertical axis wind turbine in which the bending stresses on the blade or blades is relieved.

Another object of the invention is to provide a vertical axis wind turbine in which all of the blades adopt the same angle of inclination to the vertical axis.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however of only some ways in which the principle of the invention may be employed.

In said annexed drawings.

DESCRIPTION OF THE PREFERRED EMBODIMENT

Figure 1:
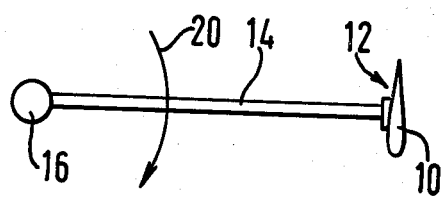
FIG. 1 is a schematic partial top plan view of a vertical axis wind turbine embodying the invention.
Figure 2:
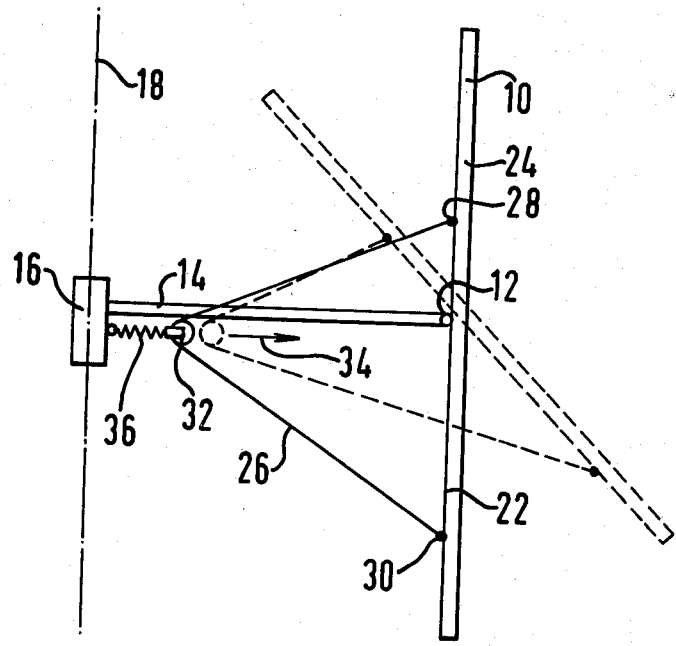
FIG. 2 is a side view of the structure shown in FIG. 1.

FIGS. 1 and 2 of the drawings show a vertical axis wind turbine or windmill comprising a blade 10 in the form of a straight, symmetrical aerofoil section. The blade 10 is hinged at a position 12 to one end of an arm 14 affixed at its other end to a hub 16. The arm 14 and hub 16 form part of a support means, the remainder of which is not shown, that mounts the blade 10 to enable the blade to rotate around a vertical axis 18 of the wind turbine in the direction of an arrow 20 (FIG. 1). The support means may be of a form well known to those skilled in the art and may comprise, for example, a shaft connected to the hub 16 and extending along the vertical axis 18 to drive a device to be powered by the wind turbine, for instance an electrical generator.

The hinge position 12 is spaced from the centre of mass of the blade 10 such that a lower part 22 of the blade 10 below the hinge position 12 is of greater length than an upper part 24 of the blade 10 above the hinge position 12. Accordingly, when the wind turbine is in use, the blade 10 will tend to pivot about the hinge at the position 12 in the sense that the lower part 22 of the blade 10 moves radially outwardly. In other words, the angle of inclination of the blade 10 to the vertical axis 18 tends to alter from the position of the blade 10 shown in full lines in FIG. 2, in which the angle is zero, towards a position as shown in dotted lines in FIG. 2.

The wind turbine illustrated in FIGS. 1 and 2 comprises a tie wire 26. (As used herein, the expression "tie wire" is to be construed broadly to include any suitable elongate flexible element.) One end of the tie wire 26 is attached to the upper part 24 of the blade 10 at a position 28. The other end of the tie wire 26 is attached to the lower part 22 of the blade 10 at a position 30. The position 30 is spaced farther from the hinge position 12 than the position 28.

The tie wire 26, intermediate its ends, is entrained around a pulley wheel 32. The pulley wheel 32 is rotatable about an axis which is perpendicular to the plane of FIG. 2 and adjacent the vertical axis 18. The axis of the pulley wheel 32 is preferably, as shown, spaced vertically below the hinge position 12, although it could instead be spaced vertically above the hinge position. The axis of the pulley wheel is desirably spaced vertically from the hinge position 12 in the same sense as the centre of mass of the blade 10.

The pulley wheel is free to move radially outwardly of the axis 18 in the direction of an arrow 34.

A tension spring 36 is affixed at one end to the hub 16 and at the other end to the pulley wheel 32. The spring 36 thus exerts a force tending to move the pulley wheel 32 radially inwardly in the direction opposite to the arrow 34, whereby the tie wire 26 is tensioned.

As will be evident, since the tie wire 26 is of substantially fixed length, when the angle of inclination of the blade 10 to the vertical axis is reduced by moving it towards the position shown in FIG. 2 in dotted lines, the pulley wheel 32 must move in the direction of the arrow 34 to accommodate the change in the angle of inclination of the blade.

The manner of operation of the above described wind turbine will now be set forth. Assume that the wind turbine is rotating at a slow speed and that its speed is increasing. The centrifugal force on the blade 10 tends to make the lower part 22 thereof move outwardly by pivoting of the blade about the hinge at the position 12, as described above. A centrifugal force component exerted by the tie wire 26 on the pulley wheel 32 tends to make the pulley wheel move in the direction of the arrow 34. However, until the speed of the turbine is sufficient for this force to be greater than that exerted by the spring 36 in its rest condition, the pulley wheel 32 will not move whereby the blade 10 remains in a vertical position. Only when the centrifugal force exerted on the pulley wheel 32 is greater than that exerted by the spring 32 can the pulley wheel 32 move in the direction of the arrow 34 towards the dotted line position and the blade 10 pivot from the position shown in full lines towards that shown in dotted lines.

By virtue of the fact that the tie wire 26 is attached to both the lower part 22 and the upper part 24 of the blade 10, then regardless of the angle of inclination of the blade 10 the tie wire 26 exerts a force on the blade 10 tending to relieve the bending stresses caused by centrifugal force.

As the angle of inclination of the blade 10 increases, the spring 36 is, of course, extended. This increases the force on the pulley wheel 32 provided by the spring 36, that is to say such force increases with the angle of inclination. In some instances, particularly in the case of larger wind turbines, it may be appropriate to replace the simple mechanical spring 36 by some other means providing a controlled increase in force with movement of the pulley wheel 32, for instance an air spring or a hydraulic jack arrangement.

If the feature of the force provided by the spring 36 or the like increasing with the angle of inclination of the blade 10 is not required, the spring or the like may be replaced by some means providing a force that does not vary substantially with movement of the pulley wheel 32, for instance a weight suspended on a cable or the like and entrained around a pulley so as to provide a force acting in the same direction as that of the spring 36, or a hydraulic jack arrangement.

Means (e.g. hydraulic means) may be provided to damp movement of the blade 10 as it changes its angle of inclination to the vertical axis 18.

Although the wind turbine of FIGS. 1 and 2 is described above as having only one blade 10, it will be evident that one or more further blades 10 could be provided. In this case, each blade may be mounted on a respective arm 14 and provided with a respective tie wire 26, pulley wheel 32 and spring 36. Alternatively, a single spring or some other means providing a force on the pulley wheels associated with the respective arms could be used instead of individual springs or the like.

Figure 3:
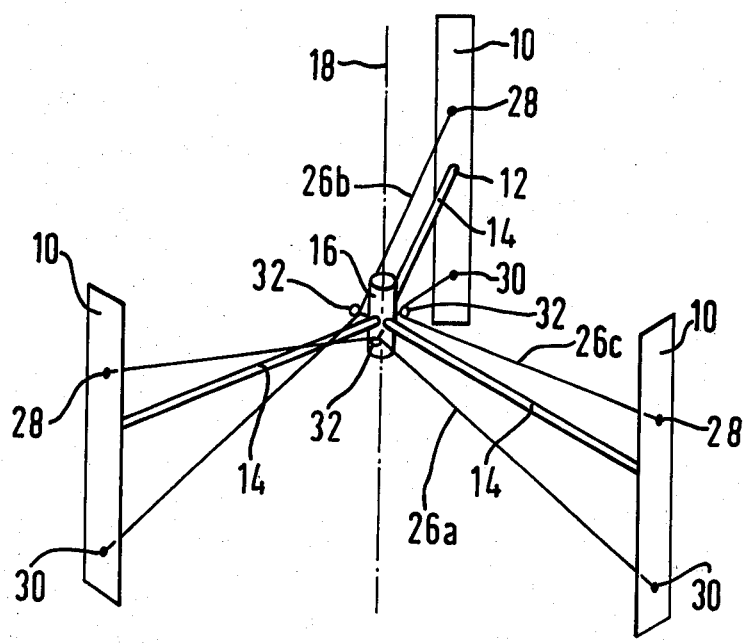
FIG. 3 is a perspective view of another vertical axis wind turbine embodying the invention.

FIG. 3 shows another vertical axis wind turbine which is in many respects similar to that described with reference to FIGS. 1 and 2. In FIG. 3, reference numerals the same as those used in FIGS. 1 and 2 designate like items. The turbine of FIG. 3 will only be described in so far as it differs from that of FIGS. 1 and 2.

The turbine shown in FIG. 3 comprises a hub 16 and three blades 10 equally spaced around the hub 16 and each supported by an arm 14 as described above with reference to FIGS. 1 and 2. The turbine includes three tie wires 26a, 26b and 26c. The tie wires are arranged as described with reference to FIGS. 1 and 2, except that each individual tie wire is connected to one blade 10 at the position 28 on that blade, entrained round one of three pulley wheels 32, and then connected to the position 30 on the next adjacent blade 10. Accordingly, while the turbine functions in the same manner as that of FIGS. 1 and 2, each blade 10 is positively coupled to the next adjacent blade by one of the tie wires. In other words, the blades are sequentially connected together by the tie wires 26a, 26b and 26c. With this arrangement, a change in the angle of inclination of any one of the blades 10 is transmitted via one of the tie wires connected thereto to an adjacent blade and from that blade to the next blade, and so forth, whereby the angles of inclination of the blades 10 to the axis 18 are constrained to remain the same.

We, therefore particularly point out and distinctly claim as our invention:

1. A vertical axis wind turbine, comprising:
a plurality of blade means;
support means for mounting the plurality of blade means thereto, said support means enabling the blade means to rotate around a vertical axis, subjecting said blade means to a centrifugal force, the blade means being hinged to the support means at a hinge position thereby permitting an angle of inclination of the blade means relative to a vertical axis passing through said support means to vary;
a plurality of tie wire means for intercoupling each of said plurality of blade means together via said support means, thereby reducing the bending stresses in said support means when said support means and said blade means rotate about said vertical axis, each of said plurality of tie wire means being connected at one end to one of said plurality of blade means at a position above said hinge position, and being connected at the other end to an adjacent one of said plurality of blade means at a position below said hinge position;

a plurality of member means connected to each of said plurality of tie wire means at an intermediate point between the two ends thereof for supporting each of said tie wire means, said member means tending to move in a direction corresponding to the movement of said blade means as said blade means and said support means rotate about said vertical axis; and a plurality of inwardly-directed force control means connected to each of said plurality of member means and mounted on said support means for subjecting each of said member means to an inwardly-directed force.

2. A vertical wind turbine as claimed in claim 1 wherein the tie wire means extend around said member means and said member means are disposed such that, when the angle of inclination of the blade means relative to the vertical axis tends to alter from a predetermined value in response to centrifugal force, the tie wire means exert a force on the member means tending to move the member means, said control means exerting a force on the member means opposing said movement thereof, whereby as the turbine speeds up the blade means will remain at the predetermined angle of inclination until the force exerted by the tie wire means on the member means exceeds the force exerted on the member means by the control means.

3. A vertical wind turbine as claimed in claim 1 wherein the tie wire means extend around said member means and said member means are disposed such that, when the angle of inclination of the blade means relative to the vertical axis tends to alter from a predetermined value in response to centrifugal force, the tie wire means exert a force on the member means tending to move the member means, said control means exerting a force on the member means opposing said movement thereof, whereby as the turbine speeds up the blade means will remain at the predetermined angle of inclination until the force exerted by the tie wire means on the member means exceeds the force exerted on the member means by the control means, and wherein the control means exerts a force on the member means which increases with any movement of the member means.

4. A vertical wind turbine as claimed in claim 2, wherein the control means comprises a resilient biassing means acting between said member and the support means.

5. A vertical wind turbine as claimed in claim 2, wherein the control means comprises a spring.

6. A vertical wind turbine as claimed in claim 2, wherein the control means comprises a tension spring.

7. A vertical wind turbine as claimed in claim 2, wherein said plurality of member means comprises a plurality of pulleys.

8. A vertical wind turbine as claimed in claim 1, wherein the intercoupling of each of said plurality of blade means by said plurality of tie wire means ensures that each of said plurality of blade means adopt the same angle of inclination relative to the vertical axis.

9. A vertical wind turbine as claimed in claim 1, wherein the hinge position on each of said plurality of blade means is displaced from the center of mass of the blade.

10. A vertical wind turbine as claimed in claim 1, wherein each of the blade means comprise an aerofoil section blade.

11. A vertical wind turbine as claimed in claim 1 wherein the distance between said position below said hinge position and said hinge position for each of said blade means defines a first segment, the distance between said position above said hinge position and said hinge position defines a second segment, the length of said first segment being different than the length of said second segment; and wherein each of said member means are vertically spaced from said hinge position of said blade means and are adjacent to the longer one of the first and second segments.

* * * * *